United States Patent [19]

Hall

[11] 4,240,887

[45] Dec. 23, 1980

[54] PROCESS OF WATER ELECTROLYIS

[75] Inventor: Dale E. Hall, Monroe, N.Y.

[73] Assignee: The International Nickel Co., Inc., New York, N.Y.

[21] Appl. No.: 21,966

[22] Filed: Mar. 19, 1979

[51] Int. Cl.$^3$ ............................ C25B 1/04; C25B 1/06
[52] U.S. Cl. .................................................. 204/129
[58] Field of Search ................. 204/129, 43 T, 290 R, 204/291

[56] References Cited

U.S. PATENT DOCUMENTS 3,394,062  7/1968  Rhodes ................................ 204/129
4,049,841  9/1977  Coker et al. ..................... 204/290 R

OTHER PUBLICATIONS

Gras et al. Proceedings of the Symposium on Electrode Materials and Processes for Energy Conversion and Storage, vol. 77-6 (1977), pp. 425-440.

Primary Examiner—Howard S. Williams
Attorney, Agent, or Firm—Francis J. Mulligan, Jr.

[57] ABSTRACT

Discloses a process of water electrolysis of concentrated alkaline aqueous solutions at temperatures above 60° C. and at anode current densities of at least about 125 mA/cm$^2$ in which the anode comprises an iron-nickel alloy containing 30% to about 45% nickel.

3 Claims, 1 Drawing Figure

PROCESS OF WATER ELECTROLYIS

The present invention is concerned with a process for the electrolysis of water and, more particularly, with a process for the electrolysis of strongly basic aqueous solutions.

BACKGROUND OF THE INVENTION DISCOVERY AND OBJECTS

Present state of the art water electrolysis takes a number of different forms in the particular types of apparatus used to produce hydrogen and oxygen from water. It is common however for electrolysis units to be designed to employ as the aqueous electrolyte a strong solution, e.g. 30% by weight solution of potassium hydroxide in water and to maintain this electrolyte at a temperature of at least about 60° C. during electrolysis.

The likelihood of increase of hydrogen production in the future as a source of portable energy alternative to fossil fuel sources depends in part on maintaining the capital cost of hydrogen production equipment at a relatively low level as well as maintaining the electrical energy cost for hydrogen production at as low a level as possible. It is believed that by means of the process of the present invention, means have been provided whereby both the capital and operating costs of water electrolyzers can be minimized.

It is an object of the present invention to provide a novel process for electrolysis of water.

Other objects and advantages will become apparent from the following description taken in conjunction with the drawing in which the FIGURE is a scanning election micrograph of an anode surface used in the process of the present invention.

DESCRIPTION OF THE INVENTION

Generally speaking, the present invention contemplates a process of electrolyzing water comprising passing direct current at an anode current density of at least 125 mA/cm$^2$ through an aqueous solution of at least 4 N alkali hydroxide maintained at a temperature of at least 60° C. between an iron-nickel alloy anode, said alloy containing in percent by weight 30% to about 45% nickel, balance iron and a cathode. By this process, one can achieve both excellent electrocatalytic effect for oxygen release at the anode thus minimizing electric power costs and low initial equipment cost through use of the relatively inexpensive, iron-rich alloy for the anode. Equivalent electrocatalytic results can be attained using anodes made of iron-nickel alloys containing about 85% to 95% nickel but the costs of these nickel-rich alloys is higher than the cost of the iron-rich alloys used in the process of the present invention.

Advantageously in the process of the present invention, the anode current density (based upon geometric area of the electrode) is in the range of about 200 to about 500 mA/cm$^2$, the solute in the electrolyte is potassium hydroxide at a concentration of about 30% (by weight) and the temperature of electrolysis is greater than about 80° C. The alloy composition comprising the initial anode material is preferably essentially binary but may contain small amounts of other elements which do not detrimentally effect the electrocatalytic properties of the binary alloy. The actual anode working surface (after a break-in period of anode service) has been found to be an oxide layer from which the oxidic iron component has been leached by the electrolyte. The nickel-rich oxide layer, albeit somewhat porous on a microscale, has been found to be substantially completely protective of the underlying metal both current carrying and stand-by conditions against the corrosive influence of the highly alkaline electrolyte. This nickel-rich oxide layer has been found to be about 150 Å thick after anodic service of about 10 hours at a current density of about 200 mA/cm$^2$.

The anode used in the process of the present invention can be of any desired mechanical configuration. For example, it is advantageous for the anode to be in the form of a thin (20 to about 280 μm thick) layer of sintered nickel-iron alloy on a metal (e.g., steel) base. Such a sintered layer is somewhat porous and is more specifically described in co-pending U.S. application Ser. No. 003,856 filed on Jan. 16, 1979 by E. L. Huston and myself, the disclosure of which is incorporated herein by reference. Alternatively the anode used in the process of the present invention can be a solid sheet, tube or any other shape of any required thickness and strength. Examples Hydrogen and oxygen were generated by the electrolysis of 5 N aqueous KOH at a temperature of 80° C. and an anode current density of 200 mA/cm$^2$. Binary sheet form iron-nickel anodes were used in the process with results, in terms of corrosion and anode potential (versus a standard calomel electrode) as set forth in Table I.

TABLE I

| Example No. | % Ni | Corrosion Rate* | ANODE OVERPOTENTIAL (V) Initial | after 5.5 hrs. |
|---|---|---|---|---|
| Comparative | 0 | ** | 0.46 | 0.46 |
| The Invention | 39 | 2.6 | 0.33 | 0.41 |
| Comparative | 70 | 6.0 | 0.43 | 0.50 |
| Comparative | 100 | 2.2 | 0.37 | 0.42 |

*mg/dm$^2$/day measured in anodic service
**Rapid visible corrosion

The data set forth in Table I demonstrates that the process of the present invention involving the use of anodes made of iron-rich nickel-iron binary alloys is highly advantageous from a commercial point of view.

The most advantageous process of the present invention employs anodes which were prepared by using a powder made by co-decomposing nickel carbonyl and iron carbonyl to form a 37% nickel, balance iron alloy powder. This alloy powder was applied to a mild steel base by means of an aqueous slurry containing a polysilicate binder. After drying the coated base was sintered in a reducing atmosphere for one hour at 760° C. Comparative nickel anodes made in a similar manner using nickel 123 powder were made. Results of using these anodes at three different thickness levels are set forth in Table II, the measurements of oxygen overpotential being taken after approximately 6.5 hours of electrolysis in 30% KOH solution at 80° C. at a constant current density of 200 mA/cm$^2$.

TABLE II

| Electrode Composition | Coating Thickness, μm | $\eta_{O_2}$ (V) at (mA/cm$^{-2}$) | | | | |
|---|---|---|---|---|---|---|
| | | 1 | 10 | 100 | 200 | 400 |
| 37 NiFe | 38 | .17 | .20 | .25 | .27 | .29 |
| 37 NiFe | 58 | .16 | .20 | .23 | .25 | .27 |
| 37 NiFe | 107 | .15 | .19 | .23 | .24 | .27 |
| Ni | 36 | .16 | .19 | .23 | .25 | .29 |
| Ni | 64 | .16 | .20 | .24 | .26 | .29 |
| Ni | 112 | .14 | .18 | .22 | .23 | .26 |

Table II shows that the most preferred process of the present invention using anodes of 37% nickel balance iron is substantially equal in merit to a process wherein the more expensive, pure nickel anodes are used. Thus the present invention provides a process for electrolytically producing hydrogen which is cheaper than the process using pure nickel anodes.

The FIGURE of the drawing is a scanning electron micrograph of 1000 power magnification of the surface of the 37% iron balance nickel porous anode having a thickness of about 38 μm.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A process of electrolyzing water comprising passing direct current at an anode current density of at least 125 mA/cm$^2$ through an aqueous solution of at least 4 N alkali hydroxide maintained at a temperature of at least 60° C. between an iron-nickel alloy anode, said alloy consisting of about 37% to about 39% nickel, balance iron and a cathode.

2. A process as in claim 1, wherein the electrolyte is an aqueous solution of potassium hydroxide.

3. A process as in claim 1, wherein the iron-nickel alloy of the anode is made by co-decomposition of nickel carbonyl and iron carbonyl.

* * * * *